US008608948B2

(12) United States Patent
Gabrielov et al.

(10) Patent No.: US 8,608,948 B2
(45) Date of Patent: *Dec. 17, 2013

(54) METHOD OF MAKING AN OIL AND POLAR ADDITIVE IMPREGNATED COMPOSITION USEFUL IN THE CATALYTIC HYDROPROCESSING OF HYDROCARBONS

(75) Inventors: Alexei Grigorievich Gabrielov, Houston, TX (US); John Anthony Smegal, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/559,935

(22) Filed: Jul. 27, 2012

(65) Prior Publication Data

US 2012/0295786 A1 Nov. 22, 2012

Related U.S. Application Data

(62) Division of application No. 12/407,479, filed on Mar. 19, 2009, now Pat. No. 8,262,905.

(51) Int. Cl.
*C10G 47/02* (2006.01)
*B01J 31/04* (2006.01)

(52) U.S. Cl.
USPC ........... 208/217; 502/173; 502/314; 208/112; 423/248

(58) Field of Classification Search
None
See application file for complete search history.

(56) References Cited

U.S. PATENT DOCUMENTS

| | | | |
|---|---|---|---|
| 3,959,179 A | 5/1976 | Mikovsky et al. | 252/455 Z |
| 4,943,547 A | 7/1990 | Seamans et al. | 502/150 |
| 4,969,990 A | 11/1990 | Simpson | 208/216 PP |
| 4,981,832 A | 1/1991 | Tawara et al. | 502/314 |
| 5,177,047 A | 1/1993 | Threlkel | 502/200 |
| 5,200,381 A | 4/1993 | Kamo | 502/170 |
| 5,215,954 A | 6/1993 | Seamans et al. | 502/219 |
| 5,221,656 A | 6/1993 | Clark et al. | 502/315 |
| 5,232,888 A | 8/1993 | Kamo | 502/170 |
| 5,244,858 A | 9/1993 | Usui et al. | 502/220 |
| 5,266,188 A | 11/1993 | Kukes et al. | 208/216 |
| 5,292,702 A | 3/1994 | Seamans et al. | 502/219 |
| 5,322,829 A | 6/1994 | Artes et al. | 502/315 |
| 5,338,717 A | 8/1994 | Aldridge et al. | 502/211 |
| 5,397,456 A | 3/1995 | Dai et al. | 208/108 |
| 5,439,859 A | 8/1995 | Durante et al. | 502/66 |
| 5,444,033 A | 8/1995 | Usui et al. | 502/314 |
| 5,498,586 A | 3/1996 | Dai et al. | 502/313 |
| 5,688,736 A | 11/1997 | Seamans et al. | 502/219 |
| 5,733,518 A | 3/1998 | Durante et al. | 423/248 |
| 6,329,314 B1 | 12/2001 | Mignard et al. | 502/222 |
| 6,436,870 B1 | 8/2002 | Iijima et al. | 502/305 |
| 6,509,291 B2 * | 1/2003 | Eijsbouts | 502/216 |
| 6,540,908 B1 * | 4/2003 | Eijsbouts et al. | 208/216 R |
| 6,872,678 B2 | 3/2005 | Eijsbouts | 502/29 |
| 7,011,807 B2 | 3/2006 | Zhou et al. | 423/854 |
| 2005/0109674 A1 | 5/2005 | Klein | 208/111.3 |
| 2005/0266985 A1 | 12/2005 | Iwata | 502/208 |
| 2007/0275845 A1 | 11/2007 | Jansen et al. | 502/24 |
| 2009/0038993 A1 | 2/2009 | Gabrielov et al. | 208/243 |

OTHER PUBLICATIONS

Perdew, J. P. & Wang, Y., "*Accurate and Simple Analytic Representation of the Electron-Gas Correlation Energy*", Physical Review B, (Jun. 1992) vol. 45, No. 23, pp. 13244-13249.
Hedin, L. et al, "*Explicit Local Exchange-Correlation Potentials*", J. Phys. C: Solid St. Phys., (Mar. 1971) vol. 4, pp. 2064-2083.
Ceperley, D. M., "*The Ground State of the Electron Gas by a Stochastic Method*", Phys. Rev. Lett., vol. 45, pp. 566-569 (1980).
Slater, J. C., "*Statistical Exchange-Correlation in the Self-Consistent Field*", Adv. Quantum Chem., vol. 6, 1-92 (1972).
Dewar, M. J. S., "*Development and Status of MINDO/3 and MNDO*", J. Mol. Structure, 1983, vol. 100, pp. 41-50, Elseview Science Publishers B.V., Amsterdam.
Roothaan, C. C. J., "*New Developments in Molecular Orbital Theory*", Rev. Mod. Phys., 23, 69-89 (1951).
Levy, M. "*Universal Variational Functionals of Electron Densities, First-Order Density Matrices, and Natural Spin-Orbitals and Solution of the V-Representability Problem*", Proc. Natl. Acad. Sci. U SA, vol. 76, No. 12, pp. 6062-6065 (1979).
Rives, Alain et al., "*Silica and Alumina Impregnated With Dimethylformamide Solutions of Molybdophosphoric or Tungstophosphoric Acids for Hydrotreatment Reactions*", Catalysis Letters, vol. 71, No. 3-4, 2001.
Hohenberg, P.; Kohn, W. "*Inhomogeneous Electron Gas*", Phys. Rev. B, vol. 136, pp. 864-871 (1964).
Delley, B., "*An All-Electron Numerical Method for Solving the Local Density Functional for Polyatomic Molecules*", J. Chem. Phys., vol. 92, pp. 508-517, (1990).
Takehiro, S. et at, "*Effects of Adding Chelating Agents During Preparation of Co-Mo Desulphurisation Catalyst (Part 2)*" & "*Influence of Nitrilotriacetic Acid Addition on Surface Structure*", Department of Molecular Chemistry & Engineering, Faculty of Engineering, Tohoku University, Aoba, Aramaki, Aoba-ku, Sendai 980-77, Sekiyu Gakkashii, vol. 39, No. 2 1996.

\* cited by examiner

*Primary Examiner* — Melvin C Mayes
*Assistant Examiner* — Colette Nguyen
(74) *Attorney, Agent, or Firm* — Charles W. Stewart

(57) ABSTRACT

A composition that comprises a support material having incorporated therein a metal component and impregnated with both hydrocarbon oil and a polar additive. The composition that is impregnated with both hydrocarbon oil and polar additive is useful in the hydrotreating of hydrocarbon feedstocks, and it is especially useful in applications involving delayed feed introduction whereby the composition is first treated with hot hydrogen, and, optionally, with a sulfur compound, prior to contacting it with a hydrocarbon feedstock under hydrodesulfurization process conditions.

11 Claims, 3 Drawing Sheets

METHOD OF MAKING AN OIL AND POLAR ADDITIVE IMPREGNATED COMPOSITION USEFUL IN THE CATALYTIC HYDROPROCESSING OF HYDROCARBONS

This application is a division of application Ser. No. 12/407,479 filed Mar. 19, 2009, is now U.S. Pat. No. 8,262,905, the entire disclosure of which is hereby incorporated by reference.

This invention relates to a composition that is impregnated with hydrocarbon oil and a polar additive, a method of making such a composition, and its use in the catalytic hydroprocessing of hydrocarbon feedstocks.

As a result of the recently reduced requirements on the sulfur concentration limits for diesel fuels, there has been a great effort by those in industry to find new hydrotreating catalyst formulations and products that may be used in the manufacture of low-sulfur diesel and other products. One catalyst taught by the art for use in the hydrotreating of certain hydrocarbon feedstocks so as to meet some of the more stringent sulfur regulations is disclosed in U.S. Pat. No. 5,338,717. In this patent, a hydrotreating catalyst is disclosed that is made by impregnating a Group VI (Mo and/or W) heteropolyacid onto a support followed by treating the impregnated support with an aqueous solution of a reducing agent that may be dried and thereafter impregnated with a Group VIII (Co and/or Ni) metal salt of an acid having an acidity of less than that of the Group VI heteropolyacid. This impregnated support is then dried and sulfided to provide a final catalyst. The catalyst composition disclosed in the '717 patent may also be made by impregnating a support with both the Group VIII metal salt and the Group VI heteropolyacid followed by drying and then treating with a reducing agent, drying again, and sulfiding to form the final catalyst.

Another catalyst useful in the deep hydrodesulfurization and in other methods of hydrotreating hydrocarbon feedstocks and a method of making such catalyst and its activation are disclosed in U.S. Pat. No. 6,872,678. The catalyst of the '678 patent includes a carrier upon which a Group VIB hydrogenation metal component and/or a Group VIII hydrogenation metal component and a sulfur-containing organic compound additive are incorporated and further which has been contacted with a petroleum fraction organic liquid. The catalyst is treated with hydrogen either simultaneously with or after the incorporation of the organic liquid (petroleum fraction).

In U.S. Pat. No. 6,509,291 is disclosed a catalyst and a process forsulfiding a catalyst composition that comprises a hydrogenation metal component of either a Group VI metal or a Group VIII metal, or both, and a sulfur-containing organic additive and which has first been contacted with an organic liquid (petroleum fraction) before being sulfided. The organic liquid ensures that the catalyst is able to withstand the treatment conditions prevailing during the actual sulfidation step. The sulfidation is done by contacting the additive-containing catalyst that has first been contacted with the organic liquid with gaseous hydrogen and a sulfur-containing compound that is either $H_2S$ and/or a compound that is decomposable into $H_2S$ to provide the sulfided catalyst.

U.S. Pat. No. 6,329,314 discloses a process for the activation of a hydroconversion catalyst that contains a Group VIII metal component and, optionally, a Group VI metal component by impregnating the catalyst with liquid phase petroleum fraction, a thionic compound and a nitrogenous compound under certain specified conditions.

U.S. Pat. No. 6,540,908 discloses a process for preparing a sulfided hydrotreating catalyst. This process involves combining a catalyst carrier of alumina and a hydrogenation metal catalyst carrier with an organic compound that includes a covalently bonded nitrogen atom and a carbonyl moiety followed by sulfiding the resulting combination.

There is an ongoing need to find improved higher activity hydrotreating catalysts. There is also a need to find more economical manufacturing methods and improved methods of activating hydrotreating catalysts so as to provide catalysts having better activity than catalysts activated by alternative methods.

Accordingly, provided is a composition that comprises a support material containing a metal component of a metal salt solution, hydrocarbon oil, and a polar additive having a dipole moment of at least 0.45, wherein the weight ratio of said hydrocarbon oil to polar additive is in the range upwardly to 10:1. Another embodiment of the inventive composition comprises a support material that is loaded with an active metal precursor, a hydrocarbon oil, and a polar additive having a dipole moment of at least 0.45, wherein the weight ratio of said hydrocarbon oil to polar additive is in the range upwardly to 10:1, and wherein said support material is thereafter treated with hydrogen.

The aforedescribed inventive compositions may be made by one of several embodiments of the inventive method with one such embodiment comprising incorporating a metal-containing solution into a support material to provide a metal-incorporated support material; and incorporating hydrocarbon oil and a polar additive having a dipole moment of at least 0.45 into said metal-incorporated support material to thereby provide an oil and additive impregnated composition having a weight ratio of said hydrocarbon oil to polar additive is in the range upwardly to 10:1.

FIG. 1 presents comparison plots of the weighted average bed temperature (WABT) over time for the hydrodesulfurization of a distillate feedstock to yield a low sulfur distillate product having a 10 ppmw sulfur concentration with one plot representing the result of using a hydrocarbon oil only impregnated composition that has been hydrogen treated and sulfided, and the other plot representing the result of using a composition that has been impregnated with a blended mixture of 50% hydrocarbon oil and 50% polar additive and that has been hydrogen treated and sulfided.

FIG. 2 presents for comparison the drift spectra for a catalyst impregnated with both hydrocarbon oil and a polar additive that has been treated with hydrogen and one that has not been treated with hydrogen.

Figure 1:
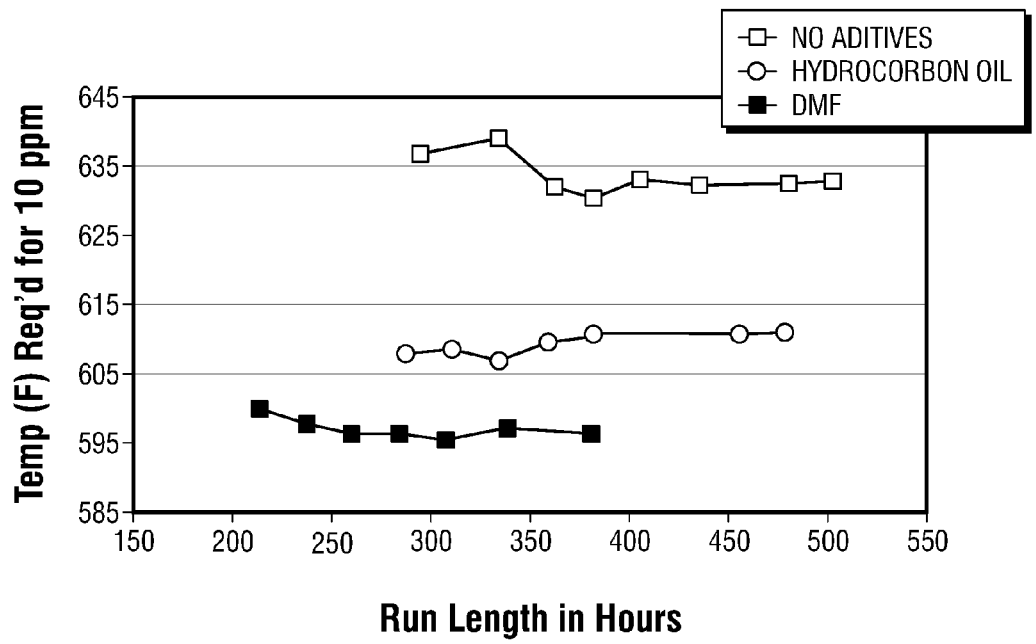

The composition of the invention is one which is particularly useful in the catalytic hydroprocessing of petroleum or other hydrocarbon feedstocks, or the composition of the invention is one which is convertible by the treatment with hydrogen or a sulfur compound, or both, into a catalyst composition having particularly good catalytic properties in the hydroprocessing of hydrocarbon feedstocks.

It is a significant feature of the inventive composition that, by using a polar additive in combination with hydrocarbon oil to impregnate its support material that includes, among other components, a catalytic metal, a composition is provided which has certain catalytic properties that are enhanced over those of a composition that is prepared by using hydrocarbon oil alone, i.e., impregnated with hydrocarbon oil without the inclusion of a material amount of a polar additive.

Another beneficial attribute of the invention is that the composition does not need to be calcined or to have sulfur added to it prior to its placement into a reactor vessel or within a reactor system for use in the hydrodesulfurization of a hydrocarbon feedstock. This feature provides the particular benefit of significantly reducing certain costs that are associated with manufacturing and treatment of the composition, and it allows for the use of in situ activation methods that yield a catalyst composition which exhibits significantly improved hydrodesulfurization catalytic activity over certain other hydrodesulfurization catalyst compositions. The composition of the invention further allows for an improved procedure in the start-up of hydrodesulfurization reactor systems.

The composition of the invention includes a support material that has incorporated therein or is loaded with a metal component, which is or can be converted to a metal compound that has activity towards the catalytic hydrogenation of organic sulfur compounds or, otherwise, has application in the hydrodesulfurization of hydrocarbon feedstocks. This support material that contains the metal component further has incorporated therein hydrocarbon oil and a polar additive to thereby provide an oil and additive impregnated composition of the invention.

The support material of the inventive composition can comprise any suitable inorganic oxide material that is typically used to carry catalytically active metal components. Examples of possible useful inorganic oxide materials include alumina, silica, silica-alumina, magnesia, zirconia, boria, titania and mixtures of any two or more of such inorganic oxides. The preferred inorganic oxides for use in the formation of the support material are alumina, silica, silica-alumina and mixtures thereof. Most preferred, however, is alumina.

In the preparation of various embodiments of the inventive composition, the metal component of the composition may be incorporated into the support material by any suitable method or means that provides the support material that is loaded with an active metal precursor, thus, the composition includes the support material and a metal component. One method of incorporating the metal component into the support material, includes, for example, co-mulling the support material with the active metal or metal precursor to yield a co-mulled mixture of the two components. Or, another method includes the co-precipitation of the support material and metal component to form a co-precipitated mixture of the support material and metal component. Or, in a preferred method, the support material is impregnated with the metal component using any of the known impregnation methods such as incipient wetness to incorporate the metal component into the support material.

When using the impregnation method to incorporate the metal component into the support material, it is preferred for the support material to be formed into a shaped particle comprising an inorganic oxide material and thereafter loaded with an active metal precursor, preferably, by the impregnation of the shaped particle with an aqueous solution of a metal salt to give the support material containing a metal of a metal salt solution. To form the shaped particle, the inorganic oxide material, which preferably is in powder form, is mixed with water and, if desired or needed, a peptizing agent and/or a binder to form a mixture that can be shaped into an agglomerate. It is desirable for the mixture to be in the form of an extrudable paste suitable for extrusion into extrudate particles, which may be of various shapes such as cylinders, trilobes, etc. and nominal sizes such as 1/16", 1/8", 3/16", etc. The support material of the inventive composition, thus, preferably, is a shaped particle comprising an inorganic oxide material.

The shaped particle is then dried under standard drying conditions that can include a drying temperature in the range of from 50° C. to 200° C., preferably, from 75° C. to 175° C., and, most preferably, from 90° C. to 150° C. After drying, the shaped particle is calcined under standard calcination conditions that can include a calcination temperature in the range of from 250° C. to 900° C., preferably, from 300° C. to 800° C., and, most preferably, from 350° C. to 600° C.

The calcined shaped particle can have a surface area (determined by the BET method employing $N_2$, ASTM test method D 3037) that is in the range of from 50 $m^2/g$ to 450 $m^2/g$, preferably from 75 $m^2/g$ to 400 $m^2/g$, and, most preferably, from 100 $m^2/g$ to 350 $m^2/g$. The mean pore diameter in angstroms (Å) of the calcined shaped particle is in the range of from 50 to 200, preferably, from 70 to 150, and, most preferably, from 75 to 125. The pore volume of the calcined shaped particle is in the range of from 0.5 cc/g to 1.1 cc/g, preferably, from 0.6 cc/g to 1.0 cc/g, and, most preferably, from 0.7 to 0.9 cc/g. Less than ten percent (10%) of the total pore volume of the calcined shaped particle is contained in the pores having a pore diameter greater than 350 Å, preferably, less than 7.5% of the total pore volume of the calcined shaped particle is contained in the pores having a pore diameter greater than 350 Å, and, most preferably, less than 5%.

The references herein to the pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In a preferred embodiment of the invention, the calcined shaped particle is impregnated in one or more impregnation steps with a metal component using one or more aqueous solutions containing at least one metal salt wherein the metal compound of the metal salt solution is an active metal or active metal precursor. The metal elements are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) is also a desired metal component. For the Group 9 and 10 metals, the metal salts include Group 9 or 10 metal acetates, formats, citrates, oxides, hydroxides, carbonates, nitrates, sulfates, and two or more thereof. The preferred metal salts are metal nitrates, for example, such as nitrates of nickel or cobalt, or both. For the Group 6 metals, the metal salts include Group 6 metal oxides or sulfides. Preferred are salts containing the Group 6 metal and ammonium ion, such as ammonium heptamolybdate and ammonium dimolybdate.

The concentration of the metal compounds in the impregnation solution is selected so as to provide the desired metal content in the final composition of the invention taking into consideration the pore volume of the support material into which the aqueous solution is to be impregnated and the amounts of hydrocarbon oil and polar additive that are later to be incorporated into the support material that is loaded with a metal component. Typically, the concentration of metal compound in the impregnation solution is in the range of from 0.01 to 100 moles per liter.

The metal content of the support material having a metal component incorporated therein may depend upon the application for which the oil and polar additive impregnated composition of the invention is to be used, but, generally, for hydroprocessing applications, the Group 9 and 10 metal component, i.e., cobalt or nickel, preferably, nickel, can be present in the support material having a metal component incorporated therein in an amount in the range of from 0.5 wt. % to 20 wt. %, preferably from 1 wt. % to 15 wt. %, and, most preferably, from 2 wt. % to 12 wt. %; and the Group 6 metal component, i.e., molybdenum or tungsten, preferably, molybdenum, can be present in the support material having a metal component incorporated therein in an amount in the range of from 5 wt. % to 50 wt. %, preferably from 8 wt. % to 40 wt. %, and, most preferably, from 12 wt. % to 30 wt. %. The above-referenced weight percents for the metal components are based on the dry support material and the metal component as the element regardless of the actual form of the metal component.

To provide the oil and polar additive impregnated composition of the invention, a suitable hydrocarbon oil and a suitable polar additive are incorporated into the support material that also has incorporated therein, as described above, the active metal precursor. The hydrocarbon oil and polar additive are used to fill a significant portion of the available pore volume of the pores of the support material, which is already loaded with the active metal precursor, to thereby provide a composition that comprises a support material containing a metal component, hydrocarbon oil and a polar additive.

The composition may be installed, as is, into a reactor vessel or within a reactor system that is to undergo a start-up procedure in preparation of or prior to the introduction of a sulfiding feed that can include a sulfiding agent or a hydrocarbon feedstock containing a concentration of an organic sulfur compound.

It is a significant aspect of the invention that the support material loaded with an active metal precursor is not calcined or sulfided prior to its loading into a reactor vessel or system for its ultimate use as a hydrodesulfurization catalyst but that it can be sulfided, in situ, in a delayed feed introduction start-up procedure. The delayed feed introduction start-up procedure is hereinafter more fully described. Moreover, it has been determined that an improvement in catalytic activity is obtainable when, prior to hydrogen treatment and sulfiding, the support material loaded with the active metal precursor is filled with both hydrocarbon oil and polar additive. Thus, not only are certain economic benefits realized by eliminating, or at least not incurring, the costs associated with calcination and sulfidation of the catalyst prior to its delivery and use, but also a more active catalyst is obtained.

It has been found that the support material loaded with an active metal precursor that is impregnated with both hydrocarbon oil and a polar additive before treatment with hydrogen followed by treatment with a sulfur compound provides a hydrotreating catalyst having a greater hydrodesulfurization activity than the support material, loaded with an active metal precursor, but which has been impregnated with only hydrocarbon oil prior to the hydrogen and sulfur treatments. Also, the metal loaded support material that has been impregnated with both hydrocarbon oil and a polar additive and then treated with hydrogen and sulfur exhibits greater hydrodesulfurization activity than the metal loaded support material which has not been impregnated with the hydrocarbon oil before its treatment with hydrogen and sulfur.

It is theorized that the improvement in catalytic activity of the inventive catalyst is in part due to the hydrocarbon oil being present in the hydrocarbon oil and polar additive impregnated composition when it is heated-up in the presence of hydrogen gas by protecting the active catalyst sites therein from reacting with the hydrogen. This is believed to prevent the active phase degradation and sintering that cause activity loss. As for the improvement in catalytic activity that results from the use and presence of the polar additive, it is believed that the polar additive interacts with the molybdenum, for example, molybdenum oxide, contained in the composition in a manner that helps in providing for or maintaining dispersion of the molybdenum metal within the composition.

In the preparation of the inventive composition, any suitable method or means may be used to impregnate the metal loaded support material with the hydrocarbon oil and polar additive. The impregnation with the hydrocarbon oil may be done separately from the impregnation with the polar additive or the impregnation with the hydrocarbon oil may be done coincidentally with impregnation with polar additive. It is preferred to impregnate the metal loaded support material with a mixture or blend of the hydrocarbon oil and polar additive. The hydrocarbon oil and polar additive should be present in the mixture or blend in the desired relative amounts. Due to the physical characteristics of the hydrocarbon oil and polar additive, the mixture or blend of the two will typically be an emulsion with one of the components being dispersed in the other.

The preferred method of impregnation may be any standard well-known pore fill methodology whereby the pore volume is filled by taking advantage of capillary action to draw the liquid into the pores of the metal loaded support material. It is desirable to fill at least 75% of the pore volume of the metal loaded support material with the hydrocarbon oil and polar additive. It is preferred for at least 80% of the pore volume of the metal loaded support material to be filled with the hydrocarbon oil and polar additive, and, most preferred, at least 90% of the pore volume is filled with the hydrocarbon oil and polar additive.

It is thought that the presence of the polar additive in the metal loaded support material in combination with the hydrocarbon oil provides a catalytic benefit and thus the relative weight ratio of the hydrocarbon oil to polar additive incorporated into the metal loaded support material should be in the range upwardly to 10:1 (10 weight parts hydrocarbon oil to 1 weight part polar additive), for example, the weight ratio may be in the range of from 0:1 to 10:1. For a binary mixture of hydrocarbon oil and polar additive, this is in the range of from 0 wt % to 91 wt % hydrocarbon oil, based on the weight of the binary mixture.

Typically, the relative weight ratio of hydrocarbon oil to polar additive incorporated into the metal loaded support material should be in the range of from 0.01:1 (1 wt % for binary mixture) to 9:1 (90 wt % for a binary mixture). Preferably, this relative weight ratio is in the range of from 0.1:1 (9 wt % for binary mixture) to 8:1 (89 wt % for a binary mixture), more preferably, from 0.2:1 (17 wt % for a binary mixture) to 7:1 (87 wt % for a binary mixture), and, most preferably, it is in the range of from 0.25:1 (20 wt % for a binary mixture) to 6:1 (86 wt % for a binary mixture).

A typical commercial blend of a mixture, comprising hydrocarbon oil and polar additive, that is used to impregnate the metal-loaded support contains a polar additive in the range of from 10 wt % to 90 wt % of the total weight of the mixture, and a hydrocarbon oil in the range of from 10 wt % to 90 wt % of the total weight of the mixture. It is desirable, however, for the polar additive to be present in the mixture at a concentration in the range of from 15 wt % to 60 wt % with the hydrocarbon oil being present in the mixture at a concentration in the range of from 40 wt % to 85 wt %. Preferably, the polar additive is present in the mixture at a concentration in the range of from 20 wt % to 40 wt % with the hydrocarbon oil being present in the mixture at a concentration in the range of from 60 wt % to 80 wt %.

In the preparation of the polar additive and hydrocarbon oil mixture for impregnation into the metal loaded support material, the polar additive should be present in the mixture at a concentration of at least 10 wt % of the mixture in order to avoid problems associated with self heating.

Possible hydrocarbon oils that may be used to prepare the inventive composition can be any suitable hydrocarbon compound or mixture of compounds that provide for the benefits as described herein. Because the hydrogen treatment of the support material that is loaded with an active metal precursor and which is filled or impregnated with the hydrocarbon oil (and also the polar additive) includes exposure thereof to a gaseous atmosphere containing hydrogen at a temperature ranging upwardly to 250° C., to obtain the maximum benefit from the impregnation with the hydrocarbon oil, its boiling temperature should be such that it predominantly remains in the liquid phase at the contacting temperature of the hydrogen-containing gaseous atmosphere during treatment therewith.

In terms of boiling temperature range, the hydrocarbon oil generally should include hydrocarbons having a boiling temperature in the range of from 100° C. to 550° C. and, preferably, from 150° C. to 500° C. Possible suitable hydrocarbon oils for impregnation or incorporation into the support material loaded with an active metal precursor can include crude oil distillate fractions, such as, for example, heavy naphtha, containing hydrocarbons boiling, perhaps, in the range of from 100° C. to 210° C., kerosene, diesel, and gas oil. Among these distillate fractions, diesel is the preferred hydrocarbon oil, which typically includes hydrocarbons having a boiling temperature in the range of from 170° C. to 350° C.

The hydrocarbon oils that are particularly suitable for use in filling the pores of the support material containing a metal component include olefin compounds that are liquid at the elevated contacting temperature of the hydrogen-containing gaseous atmosphere during treatment therewith. The desirable olefins for use as the hydrocarbon oil or a portion thereof are those olefin compounds having a carbon number greater than 12 and, generally, having a carbon number in the range of from 12 to 40 carbons. It is preferred for the olefin compounds for use as the hydrocarbon oil to be those having from 14 to 38 carbons, and, most preferably, the carbon number is in the range of from 16 to 36 carbons. The olefins may be in an admixture with non-olefinic hydrocarbons, such as alkanes or aromatic solvents or any of the above-referenced petroleum distillate fractions, such as, heavy naphtha, kerosene, diesel, and gas oil.

In general, the olefin content of the hydrocarbon oil may be above 5 wt. %, and, in certain instances, it can be desirable for the hydrocarbon oil to have an olefin content exceeding 10 wt. %, and even exceeding 30 wt. %. The olefin compounds may include monoolefins or they may include olefins with multiple carbon double bonds. Particularly desirable olefins for use as the hydrocarbon oil of the invention are alpha-olefins, which are monoolefins with the carbon double bound being located at the alpha carbon of the carbon chain of the olefin compound. An especially preferred hydrocarbon oil is a mixture of alpha olefin hydrocarbon molecules that have from 18 to 30 carbon atoms per molecule.

The polar additive that may be used in the preparation of the inventive composition can be any suitable molecule that provides for the benefits and has the characteristic molecular polarity or molecular dipole moment and other properties, if applicable, as are described herein. Molecular polarity is understood in the art to be a result of non-uniform distribution of positive and negative charges of the atoms that make up a molecule. The dipole moment of a molecule may be approximated as the vector sum of the individual bond dipole moments, and it can be a calculated value.

One method of obtaining a calculated value for the dipole moment of a molecule, in general, includes determining by calculation the total electron density of the lowest energy conformation of the molecule by applying and using gradient corrected density functional theory. From the total electron density the corresponding electrostatic potential is derived and point charges are fitted to the corresponding nuclei. With the atomic positions and electrostatic point charges known, the molecular dipole moment can be calculated from a summation of the individual atomic moments.

As the term is used in this description and in the claims, the "dipole moment" of a given molecule is that as determined by calculation using the publicly available, under license, computer software program named Materials Studio, Revision 4.3.1, copyright 2008, Accerlys Software Inc.

Following below is a brief discussion of some of the technical principles behind the computation method and application of the Materials Studio computer software program for calculating molecular dipole moments.

The first step in the determination of the calculated value of the dipole moment of a molecule using the Materials Studio software involves constructing a molecular representation of the compound using the sketching tools within the visualizer module of Materials Studio. This sketching process involves adding atoms to the sketcher window that constitute the compound and completing the bonds between these atoms to fulfill the recognized bonding connectivity that constitute the compound. Using the clean icon within the Material Studio program automatically orients the constructed compound into the correct orientation. For complex compounds, a conformational search is performed to ensure that the orientation used to calculate the molecular dipole is the lowest energy conformation, i.e., it's natural state.

The quantum mechanical code DMo13 (Delley, B. *J. Chem. Phys.*, 92, 508 (1990)) is utilized to calculate the molecular dipole moments from first principles by applying density functional theory. Density functional theory begins with a theorem by Hohenberg and Kohn (Hohenberg, P.; Kohn, W. "Inhomogeneous electron gas", *Phys. Rev. B*, 136, 864-871 (1964); Levy, M. "Universal variational functionals of electron densities, first-order density matrices, and natural spin-orbitals and solution of the v-representability problem", *Proc. Natl. Acad. Sci. U.S.A.*, 76, 6062-6065 (1979)), which states that all ground-state properties are functions of the charge density $\rho$. Specifically, the total energy $E_t$ may be written as:

$$E_t[\rho]=T[\rho]+U[\rho]+E_{xc}[\rho] \qquad \text{Eq.1}$$

where $T[\rho]$ is the kinetic energy of a system of noninteracting particles of density $\rho$, $U[\rho]$ is the classical electrostatic energy due to Coulombic interactions, and $E_{xc}[\rho]$ includes all many-body contributions to the total energy, in particular the exchange and correlation energies. As in other molecular orbital methods (Roothaan, C. C. J. "New developments in molecular orbital theory", *Rev. Mod. Phys.*, 23, 69-89 (1951); Slater, J. C. "Statistical exchange-correlation in the self-consistent field", *Adv. Quantum Chem.*, 6, 1-92 (1972); Dewar, M. J. S. *J. Mol. Struct.*, 100, 41 (1983)), the wavefunction is taken to be an antisymmetrized product (Slater determinant) of one-particle functions, that is, molecular orbitals:

$$\psi = A(n)|\phi_1(1)\phi_2(2)\ldots\phi_n(n)| \quad \text{Eq. 2}$$

The molecular orbitals also must be orthonormal:

$$\langle\phi_i|\phi_j\rangle = \delta_{i,j} \quad \text{Eq. 3}$$

The charge density summed over all molecular orbitals is given by the simple sum:

$$\rho(r) = \sum_i |\phi_i(r)|^2 \quad \text{Eq. 4}$$

where the sum goes over all occupied molecular orbitals $\phi_i$. The density obtained from this expression is also known as the charge density. From the wavefunctions and the charge density the energy components from Eq. 1 can be written (in atomic units) as:

$$T = \left\langle \sum_i^n \phi_i \left| \frac{-\nabla^2}{2} \right| \phi_i \right\rangle \quad \text{Eq. 5}$$

In Eq. 6, Zα refers to the charge on nucleus α of an N-atom system. Further, in Eq. 6, the term $\rho(r_1)V_N$, represents the electron-nucleus attraction, the term $\rho(r_1)V_e(r_1)/2$, represents the electron-electron repulsion, and the term, $V_{NN}$, represents the nucleus-nucleus repulsion.

$$U = \sum_i^n \sum_\alpha^N \left\langle \phi_i(r) \left| \frac{-Z}{R_\alpha - r} \right| \phi_i(r) \right\rangle + \quad \text{Eq. 6}$$

$$\frac{1}{2}\sum_i \sum_j \left\langle \phi_i(r_1)\phi_j(r_2) \frac{1}{r_1-r_2} \phi_i(r_1)\phi_j(r_2) \right\rangle +$$

$$\sum_\alpha^N \sum_{\beta<\alpha} \frac{Z_\alpha Z_\beta}{|R_\alpha - R|}$$

$$= -\sum_\alpha^N \left\langle \rho(r_1) \frac{Z_\alpha}{|R_\alpha - r_1|} \right\rangle + \frac{1}{2}\left\langle \rho(r_1)\rho(r_2) \frac{1}{|r_1-r_2|} \right\rangle +$$

$$\sum_\alpha^N \sum_{\beta<\alpha} \frac{Z_\alpha Z}{|R_\alpha -} \equiv \langle -\rho(r_1)V_N \rangle + \left\langle \rho(r_1)\frac{V_e(r_1)}{2} \right\rangle + V_{NN}$$

The term, $E_{xc}[\rho]$ in Eq. 1, the exchange-correlation energy, requires some approximation for this method to be computationally tractable. A simple and surprisingly good approximation is the local density approximation, which is based on the known exchange-correlation energy of the uniform electron gas. (Hedin, L.; Lundqvist, B. I. "Explicit local exchange correlation potentials", *J. Phys. C*, 4, 2064-2083 (1971); Ceperley, D. M.; Alder, B. J. "Ground state of the electron gas by a stochastic method", *Phys. Rev. Lett.*, 45, 566-569 (1980)). The local density approximation assumes that the charge density varies slowly on an atomic scale (i.e., each region of a molecule actually looks like a uniform electron gas). The total exchange-correlation energy can be obtained by integrating the uniform electron gas result:

$$\epsilon_{xc}[\rho] \approx \int \rho(r)\epsilon_{xc}[\rho(r)]dr \quad \text{Eq. 7}$$

where $E_{xc}[\rho]$ is the exchange-correlation energy per particle in a uniform electron gas and ρ is the number of particles. In this work the gradient corrected exchange-correlation functional PW91 is used (Perdew, J. P.; Wang, Y. *Phys. Rev. B*, 45, 13244 (1992)).

With all the components derived to describe the total energy of any molecular system within the density functional formalism, the dipole moment can be calculated from a summation of the individual electronic and nuclear dipole moment vectors which are displayed at the end of the DMol3 output file.

References herein to the polar additive are understood to mean a molecule that has polarity and having a dipole moment, as calculated by the aforementioned Materials Studio software or other known method that will provide substantially the same calculated value for the dipole moment of a molecule as the Materials Studio software will provide, which exceeds the dipole moment of the hydrocarbon oil that is used in the inventive composition.

The dipole moment of the polar additive should be at least or exceed 0.45. However, it is preferred for the polar additive to have a characteristic dipole moment that is at least or exceeds 0.5, and, more preferred, the dipole moment of the polar additive should be at least or exceed 0.6. A typical upper limit to the dipole moment of the polar additive is up to about 5, and, thus, the dipole moment of the polar additive may be, for example, in the range of from 0.45 to 5. It is preferred for the dipole moment of the polar additive to be in the range of from 0.5 to 4.5, and, more preferred, the dipole moment is to be in the range of from 0.6 to 4.

As alluded to above, it is theorized that the polarity of the polar additive is significant to the invention; because, the polarity is required for the interaction with the surface of the support material and active metal components of the support material of the inventive composition. It is by these interactions that physical and chemical bonds with the active phases of the inventive composition are formed.

A particularly desirable attribute of the polar additive is for it to be a heterocompound. A heterocompound is considered herein to be a molecule that includes atoms in addition to carbon and hydrogen. These additional atoms can include, for example, nitrogen or oxygen, or both. It is desirable for the group of heterocompounds to exclude those heterocompounds that include sulfur, and, in all cases, the polar additive does not include paraffin and olefin compounds, i.e. compounds that contain only carbon and hydrogen atoms. Considering the exclusion of sulfur-containing compounds from the definition of the group of heterocompounds, it can further be desirable for the oil and additive impregnated composition, before its treatment with hydrogen and sulfur, to exclude the material presence of a sulfur-containing compound.

Another preferred characteristic of the polar additive is for its boiling temperature to be in the range of from 50° C. to 275° C. Preferably, the boiling temperature of the polar additive is to be in the range of from 60° C. to 250° C., and, more preferably, from it is in the range of from 80° C. to 225° C.

Specific polar compounds that may be suitable for use as the polar additive of the invention are presented in the following Table 1, which also includes their calculated dipole moments.

TABLE 1

Polar Compounds and Their Calculated Dipole Moments

| Compound | Formula | Class | Boiling Point (° C.) | Calc. Dipole Moment |
|---|---|---|---|---|
| 2,4-pentanedione | $C_5H_8O_2$ | Diketone | 140 | 1.59 |
| Triethylphosphate | $C_6H_{15}O_4P$ | Phosphate | 215-216 | 3.25 |
| Triethylphosphite | $C_6H_{15}O_3P$ | Phosphite | 156 | 0.64 |
| 1-pentanol | $C_5H_{12}O$ | Alcohol | 138 | 1.85 |
| Guanidine | $CH_5N_3$ | Imine | N/a | 3.8 |
| Alanine | $C_3H_7NO_2$ | Amino acid | N/a | 2.16 |
| Glycine | $C_2H_5NO_2$ | Amino acid | N/a | 5.81 |
| Ethylenediamine | $C_2H_8N_2$ | Diamine | 116 | 2.46 |
| Monoethanolamine | $C_2H_7NO$ | Alcoholamine | 170 | 3.42 |
| Tetramethylurea | $C_5H_{12}N_2O$ | Diamine | 174-178 | 3.44 |
| Acetonitrile | $C_2H_3N$ | Nitrile | 82 | 3.87 |
| N-methylpyrrolidone | $C_5H_9NO$ | Cyclicamide | 202 | 3.92 |
| Glucose | $C_6H_{12}O_6$ | sugar | N/a | 4.38 |
| Sucrose | $C_{12}H_{22}O_{11}$ | sugar | N/a | 7.45 |
| Octylamine | $C_8H_{19}N$ | Amine | 175-176 | 1.36 |
| Phenylboronic acid | $C_6H_7BO_2$ | Boric acid | N/a | 5.86 |
| N-ethylcarbazole | $C_{14}H_{13}N$ | Carbazole | N/a | 1.93 |
| Acetophenone | $C_8H_8O$ | ketone | 202 | 3.15 |
| Diethyleneglycol | $C_4H_{10}O_3$ | Alcohol | 244-245 | 2.76 |
| Dibenzofuran | $C_{12}H_8O$ | Oxygen heterocycle | 285 | 0.78 |
| Dimethylformamide | $C_3H_7NO$ | Amide | 153 | 4.02 |
| Citric acid | $C_6H_8O_7$ | Carboxylic acid | 175 | 3.37 |
| Ethylene-diaminetetraacetic acid | $C_{10}H_{16}N_2O_8$ | polyamino carboxylic acid | N/a | 3.99 |
| Nitrilotriacetic acid | $C_6H_9NO_6$ | polyamino carboxylic acid | N/a | 1.58 |

The most preferred compounds for use as the polar additive of the invention are selected from the group of amide compounds, which includes dimethylformamide.

A particularly important aspect of the invention is for the support material having a metal component incorporated therein to be uncalcined and non-sulfided when it is impregnated with the hydrocarbon oil and polar additive. Cost savings in the preparation of the composition are realized by not having to perform the calcination or sulfidation steps. But, moreover, it has been found that, when the hydrocarbon oil and polar additive impregnated composition is further subjected to a hydrogen treatment and sulfur treatment, the resulting catalyst composition exhibits enhanced catalytic activity.

Before the incorporation of the hydrocarbon oil and polar additive into the support material having a metal component incorporated therein, particularly when the metal component is added to the support material by impregnation using an aqueous solution of a metal salt (metal-impregnated support material), it is important for this metal-impregnated support material to be dried so as to remove at least a portion of the volatile liquid contained within the pores of the support material so as to provide pore volume that can be filled with the hydrocarbon oil and polar additive. The metal-impregnated support material, thus, is dried under drying conditions that include a drying temperature that is less than a calcination temperature.

A significant feature of the invention is that the drying temperature under which the drying step is conducted does not exceed a calcination temperature. Thus, the drying temperature should not exceed 400° C., and, preferably, the drying temperature at which the metal-impregnated support material is dried does not exceed 300° C., and, most preferably, the drying temperature does not exceed 250° C. It is understood that the drying step will, in general, be conducted at lower temperatures than the aforementioned temperatures, and, typically, the drying temperature will be conducted at a temperature in the range of from 60° C. to 150° C.

The drying of the metal-impregnated support material is preferably controlled in a manner so as to provide the resulting dried metal-impregnated support material having a volatiles content that is in a particular range. The volatiles content of the dried metal-impregnated support material should be controlled so that it does not exceed 20 wt. % LOI. The LOI, or loss on ignition, is defined as the percentage weight loss of the material after its exposure to air at a temperature of 482° C. for a period of two hours, which can be represented by the following formula: (sample weight before exposure less sample weight after exposure) multiplied by 100 and divided by (sample weight before exposure). It is preferred for the LOI of the dried metal-impregnated support material to be in the range of from 1 wt. % to 20 wt. %, and, most preferred, from 3 wt. % to 15 wt. %. The dried metal-impregnated support material is further impregnated with the hydrocarbon oil and polar additive as earlier described herein.

The polar additive and hydrocarbon oil impregnated composition of the invention may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. As earlier noted, the hydrocarbon oil and polar additive impregnated composition can first undergo a hydrogen treatment that is then followed with treatment with a sulfur compound.

The hydrogen treatment includes exposing the hydrocarbon oil and polar additive impregnated composition to a gaseous atmosphere containing hydrogen at a temperature ranging upwardly to 250° C. Preferably, the hydrocarbon oil and polar additive impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The hydrocarbon oil and polar additive impregnated composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the hydrocarbon oil and polar additive impregnated composition after it has been treated with hydrogen can be done using any conventional method known to those skilled in the art. Thus, the hydrogen treated hydrocarbon oil and polar additive impregnated composition can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS). Also, preferably, the sulfiding is accomplished by contacting the hydrogen treated composition, under suitable sulfurization treatment conditions, with a hydrocarbon feedstock that contains a concentration of sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen treated hydrocarbon oil and polar additive impregnated composition to their sulfided form. Typically, the sulfiding temperature at which the hydrogen treated hydrocarbon oil and polar additive impregnated composition is contacted with the sulfur compound is in the range of from 150° C. to 450° C., preferably, from 175° C. to 425° C., and, most preferably, from 200° C. to 400° C.

When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated hydrocarbon oil and polar additive impregnated composition is sulfided generally can be in the range of from 1 bar to 70 bar, preferably, from 1.5 bar to 55 bar, and, most preferably, from 2 bar to 35 bar.

As noted above, one of the benefits provided by the hydrocarbon oil and polar additive impregnated composition of the invention is that it can be utilized in a reactor system that is started up using a so-called delayed feed introduction procedure. In the delayed feed introduction procedure, the reactor system, which includes a reactor vessel containing the hydrocarbon oil and polar additive impregnated composition, first undergoes a heating step to raise the temperature of the reactor and the hydrocarbon oil and polar additive impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the hydrocarbon oil and polar additive impregnated composition, it is thereafter treated with a sulfur compound in the manner as earlier described herein.

It has been found that the hydrocarbon oil-containing composition, after undergoing the hydrogen treatment followed by treatment with a sulfur compound, exhibits a greater catalytic activity toward hydrodesulfurization of a distillate feedstock than do other similar, but non-impregnated compositions. As discussed earlier herein, it is theorized that the presence of the hydrocarbon oil and polar additive contained in the pores of the support material having incorporated therein a metal component serves to protect the active catalytic sites from contact and reaction with hydrogen during the hydrogen treatment and thereby preventing degradation and sintering that cause activity loss.

It is recognized that the hydrocarbon oil and polar additive impregnated composition of the invention, after its treatment with hydrogen and sulfur, is a highly effective catalyst for use in the hydrotreating of hydrocarbon feedstocks. This catalyst is particularly useful in applications involving the hydrodesulfurization of hydrocarbon feedstocks, and, especially, it has been found to be an excellent catalyst for use in the hydrodesulfurization of distillate feedstocks, in particular, diesel, to make an ultra-low sulfur distillate product having a sulfur concentration of less than 15 ppmw, preferably, less than 10 ppmw, and, most preferably, less than 8 ppmw.

In the hydrotreating applications, the hydrocarbon oil and polar additive impregnated composition, preferably used in a delayed feed introduction procedure or otherwise treated with hydrogen and sulfur, as described above, is contacted under suitable hydrodesulfurization conditions with a hydrocarbon feedstock that typically has a concentration of sulfur. The more typical and preferred hydrocarbon feedstock is a petroleum middle distillate cut having a boiling temperature at atmospheric pressure in the range of from 140° C. to 410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrodesulfurization process is a middle distillate boiling in the diesel boiling range of from about 140° C. to 400° C.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw). It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The hydrocarbon oil and polar additive impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrodesulfurization process generally operates at a hydrodesulfurization reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrodesulfurization reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.). It is recognized that one of the unexpected features of the use of the inventive hydrocarbon oil and polar additive impregnated composition of the invention is that, in a delayed feed introduction application, the resultant catalyst has a significantly higher catalytic activity than certain other alternative catalyst compositions, and, thus, it will, in general, provide for comparatively lower required process temperatures for a given amount of desulfurization.

The flow rate at which the distillate feedstock is charged to the reaction zone of the inventive process is generally such as to provide a liquid hourly space velocity (LHSV) in the range of from 0.01 hr$^{-1}$ to 10 hr$^{-1}$. The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged. The preferred LHSV is in the range of from 0.05 hr$^{-1}$ to 5 hr$^{-1}$, more preferably, from 0.1 hr$^{-1}$ to 3 hr$^{-1}$. and, most preferably, from 0.2 hr$^{-1}$ to 2 hr$^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 m$^3$/m$^3$ (10,000 SCF/bbl). It is preferred for the treat gas rate to be in the range of from 89 m$^3$/m$^3$ (500 SCF/bbl) to 1781 m$^3$/m$^3$ (10,000 SCF/bbl), more preferably, from 178 m$^3$/m$^3$ (1,000 SCF/bbl) to 1602 m$^3$/m$^3$ (9,000 SCF/bbl), and, most preferably, from 356 m$^3$/m$^3$ (2,000 SCF/bbl) to 1425 m$^3$/m$^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein (e.g., less than 15 ppmw, or less than 10 ppmw, or less than 8 ppmw).

The following examples are presented to further illustrate certain aspects of the invention, but they are not to be construed as limiting the scope of the invention.

EXAMPLE 1

This Example describes the preparation of a comparative catalyst Composition A that contains neither an organic additive (hydrocarbon oil) nor polar additive.

An amount of dried and calcined standard alumina 1.3 mm trilobe extrudate was impregnated with a nickel/molybdenum/phosphorus containing impregnation solution. This impregnation solution was an aqueous solution made by dissolving nickel oxide (NiO), molybdenum trioxide (MoO$_3$) and phosphoric acid in de-ionized water with heating and stirring. A volume of the impregnation solution was used to fill the pores of the extrudate so as to load it with 4.2 wt % nickel, 18.5 wt % molybdenum, and 3.3 wt % phosphorous, with the weight percents being on a dry basis. The impregnated extrudate was allowed to age for two hours, and, then, it was dried in air at 100° C. to reduce its volatiles content to 7.3 wt % to provide the basic composition without any organic or polar additives.
(Composition A)

EXAMPLE 2

This Example describes the preparation of a comparative catalyst Composition B that does not contain any organic additive (hydrocarbon oil) or polar additive.

An amount of dried and calcined standard alumina 1.3 mm trilobe extrudate was impregnated with a cobalt/molybdenum/phosphorus containing impregnation solution. This impregnation solution was an aqueous solution made by dissolving cobalt hydroxide (Co(OH)$_2$), molybdenum trioxide (MoO$_3$) and phosphoric acid in de-ionized water with heating and stirring. A volume of the impregnation solution was used to fill the pores of the extrudate so as to load it with 4.09 wt % cobalt, 14.4 wt % molybdenum, and 2.34 wt % phosphorous, with the weight percents being on a dry basis. The impregnated extrudate was allowed to age for two hours, and, then, it was dried in air at 100° C. to reduce its volatiles content to 7.3 wt % to provide the basic composition without any organic additives. (Composition B)

EXAMPLE 3

This Example describes the preparation of a comparative catalyst Composition C that is impregnated hydrocarbon oil but does not contain a polar additive.

The hydrocarbon oil-impregnated composition (the hydrocarbon oil has a dipole moment of the oil is 0.44) was made by impregnating an amount of the non-oil impregnated composition, i.e., either Composition A or B as described above, with a volume of alpha olefinic oil, containing alpha olefins having from 18 to 30 carbon atoms, and having a density of 0.79 gm/cc. Approximately 90% of the pore volume of the non-oil impregnated composition was filled with the alpha olefinic oil. The alpha olefinic oil, having a temperature in the range of from 100 to 110° C., was impregnated into the non-oil impregnated composition, which had been pre-heated to about 85° C., to provide the hydrocarbon oil only impregnated composition. The hydrocarbon oil has a dipole moment of 0.44.

EXAMPLE 4

This example describes the preparation of the Inventive Composition that is impregnated with both hydrocarbon oil and a polar additive.

An amount of the non-oil impregnated composition, i.e., either Composition A or B as described above, was impregnated by filling approximately 90% of the pore volume with either dimethylformamide (DMF) or a mixture of dimethylformamide and hydrocarbon oil, wherein the mixture contained from 10 wt % to 50 wt % DMF. DMF has a dipole moment of 4.02.

EXAMPLE 5

This example describes the procedure used to treat the comparative catalyst Composition A, which does not contain an organic additive (hydrocarbon oil) or a polar additive, as well as the hydrocarbon oil impregnated and/or the polar additive impregnated compositions of Examples 3-4, and it presents performance results from their use in the hydrodesulfurization of a diesel feedstock (activity testing).

Trickle flow micro-reactors were used to test the hydrodesulfurization activity of the hydrocarbon oil only impregnated as well as the polar additive only impregnated and the combined hydrocarbon and polar additive impregnated compositions that are described in Examples 3-4. A 50 cc volume, based on compacted bulk density of whole pellets, of each composition was used in the testing. The reactors were packed with extrudates of each composition, which were diluted with 80-60 mesh SiC in the volumetric composition-to-diluent ratio of 1:2.8. The compositions were conditioned and sulfided using a delayed-feed introduction procedure whereby the composition was first heated up and conditioned by contacting it with pure hydrogen at the operating pressure and at a temperature in the range of from 149° C. (300° F.) to 204° C. (400° F.) for a time period of about 12 hours. Following this hydrogen treatment, the composition was sulfided using a liquid hydrocarbon containing DMDS to provide a sulfur content of 2.5%.

The activity of the compositions were tested by charging the reactor with a blended feedstock of a diesel boiling range having the distillation properties (per ASTM test D-2287) that are presented in Table 2, Test Condition 1. The feedstock had a sulfur content of 1.88 wt. %, and it was charged to the reactor, which was operated at a pressure of 1075 psig, at a rate so as to provide a liquid hourly space velocity (LHSV) of 0.86 hr$^{-1}$. The hydrogen gas rate charged to the reactor was 4,500 scf H$_2$/bbl. The weight average bed temperature (WABT) was adjusted to provide a treated product having a sulfur content that was 10 ppmw.

FIG. 1 presents the results of the testing with plots of the WABT as a function of run length (in hours) for the oil only impregnated composition and for the polar additive impregnated composition in comparison with the composition containing no organic additives. It can be observed from these plots that the polar additive impregnated composition exhibits a significantly better hydrodesulfurization catalytic activity than does the composition with no organic additives by requiring a much lower temperature to achieve the specified sulfur reduction of the feedstock. The data also show that the polar additive only impregnated composition exhibits better catalytic stability over time than does the oil only impregnated composition.

TABLE 2

Test Conditions and Feedstock Properties

|  | Test Condition 1 | Test Condition 2 | Test Condition 3 |
|---|---|---|---|
| Feedstock | GO 1 | GO 2 | GO 3 |
| Sulfur, wt % | 1.88 | 1.71 | 1.67 |
| Nitrogen, ppm | 233 | 276 | 185 |
| Distllation (D-2887) | ° F. | ° F. | ° F. |
| IBP | 268 | 272 | 344 |
| 5% | 384 | 387 | 455 |
| 50% | 542 | 558 | 620 |
| 95% | 663 | 674 | 757 |
| FBP | 714 | 776 | 813 |
| Processing Conditions |  |  |  |
| In situ Hydrogen Pre-Treatment | H$_2$, 300 psig, 300° F., 12 hrs | H$_2$, 300 psig, 300° F., 12 hrs | H$_2$, 300 psig, 300° F., 12 hrs |
| Sulfiding Agent | DMDS | TNPS | DMDS |
| Operating Pressure, psig | 1075 | 600 | 870 |
| LHSV, h$^{-1}$ | 0.86 | 1.0 | 1 |
| H$_2$/Oil, scf/bbl | 4500 | 1200 | 1200 |
| WABT Req, ° F. | Sp = 10 ppm | Sp = 10 ppm | Sp = 10 ppm |

EXAMPLE 6

This Example presents the drift spectral data for an oil and polar additive impregnated catalyst composition as described in Example 4 that has been either treated with hydrogen or not treated with hydrogen. The hydrogen treatment of the oil and polar additive impregnated catalyst composition was conducted by exposing the composition to an essentially pure hydrogen atmosphere at a temperature of 150° C. and 20.7 bar (300 psi) for 12 hours.

Figure 2:
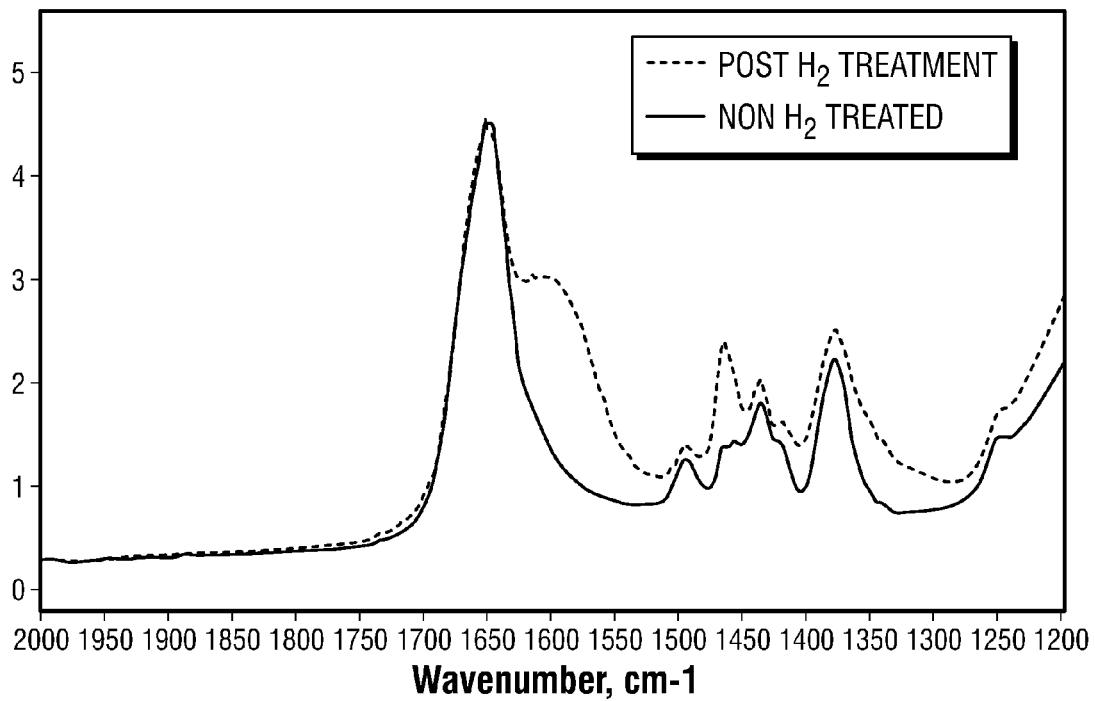

FIG. 2 presents the drift spectra for each of the two aforementioned compositions. As may be observed, the hydrogen treated composition exhibits a peak that is not exhibited by the non-hydrogen treated composition. This suggests that the hydrogen treatment provides for a transformation in the polar additive impregnated composition.

EXAMPLE 7

This example describes the preparation of the Inventive Composition that is impregnated with both hydrocarbon oil and a polar additive.

An amount of the non-oil impregnated composition, i.e., Composition B as described above, was impregnated by filling approximately 90% of the pore volume with either N-methylpyrollidone (NMP) or a mixture of N-methylpyrollidone and hydrocarbon oil, wherein the mixture contained from 10 wt % to 50 wt % NMP. NMP has a dipole moment of 3.92.

EXAMPLE 8

This example describes the preparation of the Inventive Composition that is impregnated with both hydrocarbon oil and a polar additive.

An amount of the non-oil impregnated composition, i.e., Composition B as described above, was impregnated by filling approximately 90% of the pore volume with either tetramethylurea (TMU) or a mixture of tetramethylurea and hydrocarbon oil, wherein the mixture contained from 10 wt % to 50 wt % TMU. TMU has a dipole moment of 3.44.

EXAMPLE 9

This example describes the preparation of the Inventive Composition that is impregnated with both hydrocarbon oil and a polar additive.

An amount of the non-oil impregnated composition, i.e., Composition B as described above, was impregnated by filling approximately 90% of the pore volume with either triethylphosphite (TEP) or a mixture of triethylphosphite and hydrocarbon oil, wherein the mixture contained from 10 wt % to 50 wt % TEP. TEP has a dipole moment of 0.64.

EXAMPLE 10

This example describes the procedure used to treat the combined hydrocarbon oil and polar additive impregnated compositions of Examples 7-9, and it presents performance results from their use in the hydrodesulfurization of a diesel feedstock (activity testing).

Trickle flow micro-reactors were used to test the hydrodesulfurization activity of the combined hydrocarbon and polar additive impregnated compositions that are described in Examples 7-9. A 50 cc volume, based on compacted bulk density of whole pellets, of each composition was used in the testing. The reactors were packed with extrudates of each composition, which were diluted with 80-60 mesh SiC in the volumetric composition-to-diluent ratio of 1:2.8. The compositions were conditioned and sulfided using a delayed-feed introduction procedure whereby the composition was first heated up and conditioned by contacting it with pure hydrogen at the operating pressure and at a temperature in the range of from 149° C. (300° F.) to 204° C. (400° F.) for a time period of about 12 hours. Following this hydrogen treatment, the composition was sulfided using a liquid hydrocarbon containing TNPS to provide a sulfur content of 2.5%.

The activity of the compositions were tested by charging the reactor with a blended feedstock of a diesel boiling range having the distillation properties (per ASTM test D-2287) that are presented in Table 2, Test Condition 2. The feedstock had a sulfur content of 1.71 wt. %, and it was charged to the reactor, which was operated at a pressure of 600 psig, at a rate so as to provide a liquid hourly space velocity (LHSV) of 1.0 hr$^{-1}$. The hydrogen gas rate charged to the reactor was 1200 scf H$_2$/bbl. The weight average bed temperature (WABT) was adjusted to provide a treated product having a sulfur content that was 10 ppmw.

Figure 3:
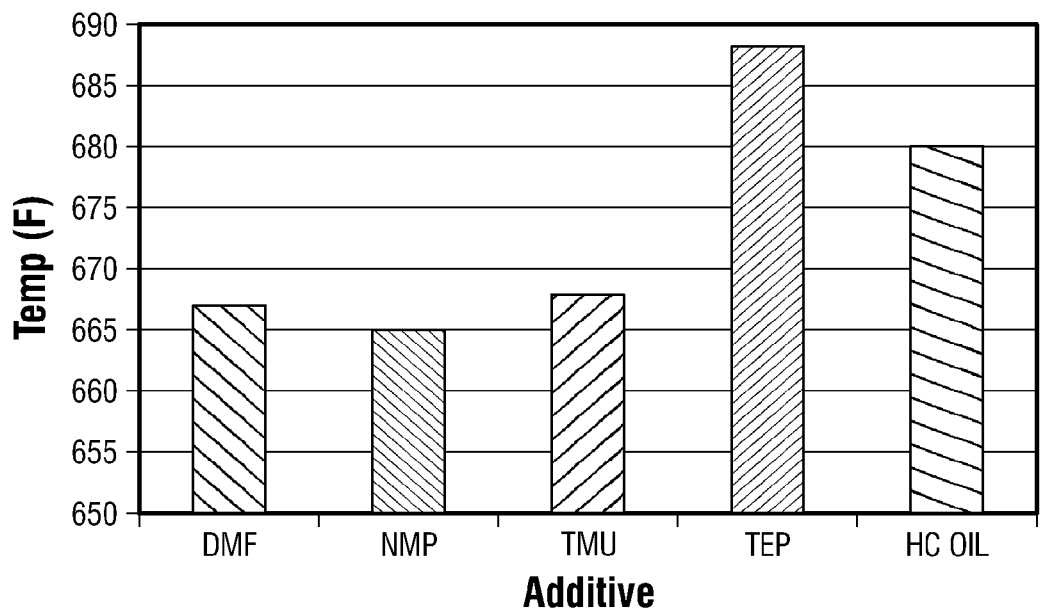
FIG. 3 is a bar chart presenting the hydrodesulfurization reaction activities of different polar additive containing catalysts of the invention.

FIG. 3 presents the results of the testing with activity determined as the WABT required to achieve 10 ppmw sulfur in the product. It can be observed from this bar graph that the combined hydrocarbon oil and polar additive impregnated compositions exhibit a significantly better hydrodesulfurization catalytic activity than does the low polarity additive (TEP) and the hydrocarbon oil only composition as indicated by the much lower temperature to achieve the specified sulfur reduction of the feedstock.

EXAMPLE 11

This example describes the preparation of the Inventive Composition that is impregnated with both hydrocarbon oil and a polar additive at various levels of polar additive and hydrocarbon oil.

An amount of the non-oil impregnated composition, i.e., Composition B as described above, was impregnated by filling approximately 90% of the pore volume with a mixture of dimethylformamide, DMF, and a hydrocarbon oil with a carbon number of 18-30. Catalysts with the following blend ratios of polar additive to hydrocarbon oil prepared were prepared: 1:9, 1:4, 3:7, 2:3 and 1:1.

EXAMPLE 12

This example describes the procedure used to treat the combined hydrocarbon oil and polar additive impregnated compositions of Example 11, and it presents performance results from their use in the hydrodesulfurization of a diesel feedstock (activity testing).

Trickle flow micro-reactors were used to test the hydrodesulfurization activity of the combined hydrocarbon and polar additive impregnated compositions that are described in Example 11. A 50 cc volume, based on compacted bulk density of whole pellets, of each composition was used in the testing. The reactors were packed with extrudates of each composition, which were diluted with 80-60 mesh SiC in the volumetric composition-to-diluent ratio of 1:2.8. The compositions were conditioned and sulfided using a delayed-feed introduction procedure whereby the composition was first heated up and conditioned by contacting it with pure hydrogen at the operating pressure and at a temperature in the range of from 149° C. (300° F.) to 204° C. (400° F.) for a time period of about 12 hours. Following this hydrogen treatment, the composition was sulfided using a liquid hydrocarbon containing TNPS to provide a sulfur content of 2.5%.

The activity of the compositions were tested by charging the reactor with a blended feedstock of a diesel boiling range having the distillation properties (per ASTM test D-2287) that are presented in Table 2, Test Condition 2. The feedstock had a sulfur content of 1.71 wt. %, and it was charged to the reactor, which was operated at a pressure of 600 psig, at a rate so as to provide a liquid hourly space velocity (LHSV) of 1.0 hr$^{-1}$. The hydrogen gas rate charged to the reactor was 1200 scf H$_2$/bbl. The weight average bed temperature (WABT) was adjusted to provide a treated product having a sulfur content that was 10 ppmw.

Figure 4:
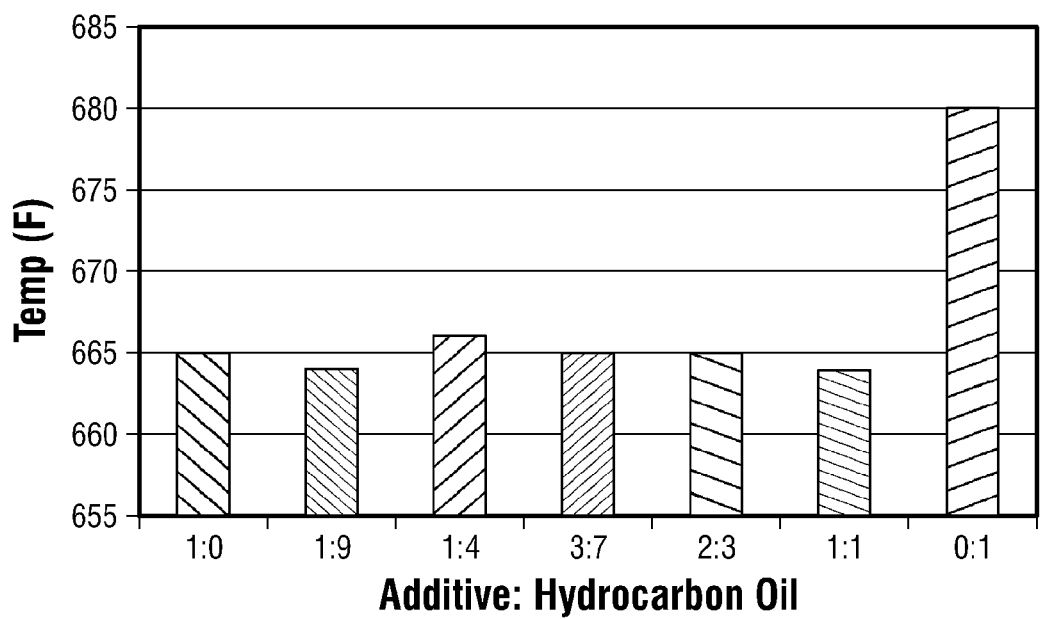
FIG. 4 is a bar chart presenting the hydrodesulfurization reaction activities of a polar additive containing catalyst, catalysts containing various proportions of polar additive and hydrocarbon oil, and a catalyst containing hydrocarbon oil only.

FIG. 4 presents the results of the testing with activity determined as the WABT required to achieve 10 ppmw sulfur in the product. It can be observed from this bar graph that the improved HDS activity is observed with all of the mixtures of polar additive with hydrocarbon oil and this improved HDS activity was similar to that achieved with a catalyst containing only the polar additive without the hydrocarbon oil. The HDS activity of the catalyst impregnated with both the polar additive and hydrocarbon oil was significantly more active than the catalyst containing only hydrocarbon oil.

EXAMPLE 13

This example describes the preparation of the Inventive Composition that is impregnated with both hydrocarbon oil and a polar additive.

An amount of the non-oil impregnated composition, i.e., Composition A as described above, was impregnated by filling approximately 90% of the pore volume with either dimethyformamide (DMF) or dimethysulfoxide (DMSO) or a mixture of dimethyformamide and hydrocarbon oil, wherein the mixture contained from 10 wt % to 50 wt % DMF. DMF has a dipole moment of 4.02, and DMSO has a dipole moment of 3.81.

EXAMPLE 14

This example describes the procedure used to treat the combined hydrocarbon oil and polar additive impregnated compositions of Example 13, and it presents performance results from their use in the hydrodesulfurization of a diesel feedstock (activity testing).

Trickle flow micro-reactors were used to test the hydrodesulfurization activity of the combined hydrocarbon and polar additive impregnated compositions that are described in Examples 13. A 50 cc volume, based on compacted bulk density of whole pellets, of each composition was used in the testing. The reactors were packed with extrudates of each composition, which were diluted with 80-60 mesh SiC in the volumetric composition-to-diluent ratio of 1:2.8. The compositions were conditioned and sulfided using a delayed-feed introduction procedure whereby the composition was first heated up and conditioned by contacting it with pure hydrogen at the operating pressure and at a temperature in the range of from 149° C. (300° F.) to 204° C. (400° F.) for a time period of about 12 hours. Following this hydrogen treatment, the composition was sulfided using a liquid hydrocarbon containing DMDS to provide a sulfur content of 2.5%.

The activity of the compositions were tested by charging the reactor with a blended feedstock of a diesel boiling range having the distillation properties (per ASTM test D-2287) that are presented in Table 2, Test Condition 3. The feedstock had a sulfur content of 1.67 wt. %, and it was charged to the reactor, which was operated at a pressure of 870 psig, at a rate so as to provide a liquid hourly space velocity (LHSV) of 1.0 hr$^{-1}$. The hydrogen gas rate charged to the reactor was 1200 scf H$_2$/bbl. The weight average bed temperature (WABT) was adjusted to provide a treated product having a sulfur content that was 10 ppmw.

Figure 5:
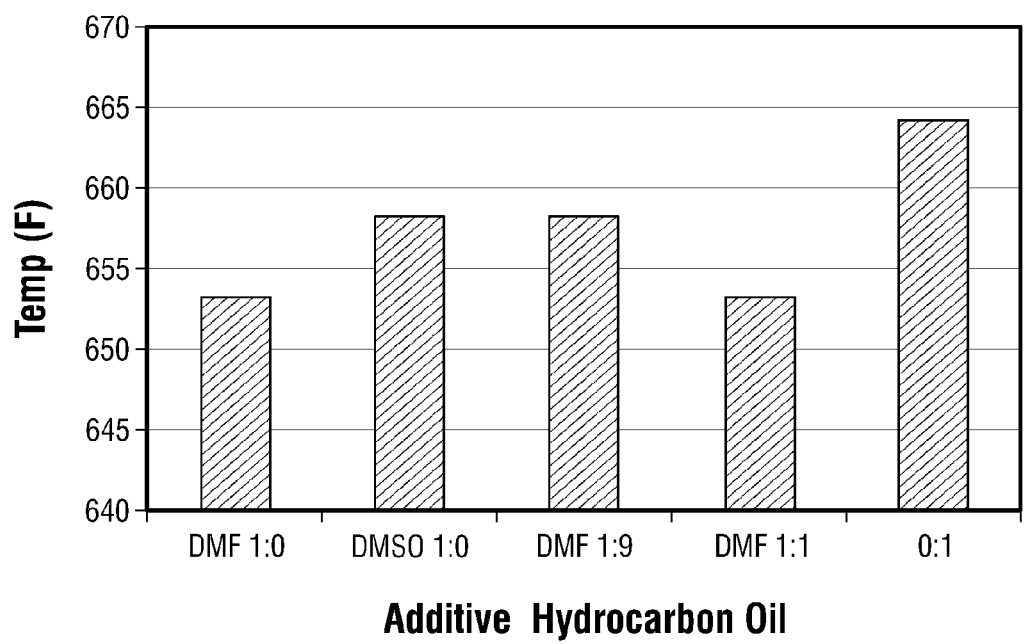
FIG. 5 is a bar chart presenting the hydrodesulfurization reaction activities of a polar additive containing catalyst, catalysts containing various proportions of polar additive and hydrocarbon oil, and a catalyst containing hydrocarbon oil only.

FIG. 5 presents the results of the testing with activity determined as the WABT required to achieve 10 ppmw sulfur in the product. It can be observed from this bar graph that the combined hydrocarbon oil and polar additive impregnated compositions exhibit a significantly better hydrodesulfurization catalytic activity than does the lower the hydrocarbon oil only composition as indicated by the much lower temperature to achieve the specified sulfur reduction of the feedstock.

That which is claimed is:

1. A method of making a composition, wherein said method comprises:

incorporating a metal-containing solution into a support material to provide a metal-incorporated support material;

drying said metal-incorporated support material so that it contains a volatiles content in the range of from 2 to 20 wt. % LOI;

incorporating hydrocarbon oil and a polar additive having a dipole moment of at least 0.45 into said metal-incorporated support material to thereby provide an oil and additive impregnated composition having a weight ratio of said hydrocarbon oil to said polar additive in the range upwardly to 10:1, wherein said polar additive has a boiling point in the range of from 50° C. to 275° C.; and, contacting said oil and additive impregnated composition under suitable hydrogen treatment conditions with hydrogen to thereby provide a hydrogen-treated composition.

2. A method as recited in claim 1, wherein said polar additive is selected from a heterocompound group consisting of heterocompounds.

3. A method as recited in claim 2, wherein said heterocompound group excludes sulfur-containing compounds.

4. A method as recited in claim 2, wherein said heterocompound group excludes paraffin and olefin hydrocarbon compounds.

5. A method as recited in claim 1, wherein said hydrocarbon oil comprises hydrocarbons having a boiling temperature in the range of from 100° C. to 550° C. and are selected from hydrocarbon mixtures of the group consisting of heavy naphtha, kerosene, diesel, gas oil, olefins having carbon numbers in the range of from 12 to 40 carbons, and mixtures of alpha olefins having carbon numbers in the range of from 18 to 30.

6. A method as recited in claim 1, wherein said metal containing solution is an aqueous solution of a metal salt of a metal compound that includes a Group 9 and Group 10 metal component selected from the group consisting of cobalt and nickel, and wherein said Group 9 and Group 10 metal component is present in said composition in an amount in the range of from 0.5 wt. % to 20 wt. %.

7. A method as recited in claim 6, wherein said metal compound further includes a Group 6 metal component selected from the group consisting of molybdenum and tungsten, and wherein said Group 6 metal component is present in said composition in an amount in the range of from 5 wt. % to 50 wt. %.

8. A method of making a composition, wherein said method comprises:

incorporating a metal-containing solution into a support material to provide a metal-incorporated support material;

drying said metal-incorporated support material so as to contain volatiles in the range of from 2 to 20 wt. % LOI;

incorporating hydrocarbon oil and a polar additive having a dipole moment of at least 0.45 into said metal-incorporated support material to thereby provide an oil and additive impregnated composition having a weight ratio of said hydrocarbon oil to said polar additive in the range upwardly to 10:1 wherein said hydrocarbon oil comprises hydrocarbons having a boiling temperature in the range of from 100° C. to 550° C. and are selected from hydrocarbon mixtures of the group consisting of heavy naphtha, kerosene, diesel, gas oil, olefins having carbon numbers in the range of from 12 to 40 carbons, and mixtures of alpha olefins having carbon numbers in the range of from 18 to 30; and, contacting said oil and additive impregnated composition under suitable hydrogen treatment conditions with hydrogen to thereby provide a hydrogen-treated composition.

9. A method of making a composition, wherein said method comprises:

incorporating a metal-containing solution into a support material to provide a metal-incorporated support material, wherein said metal containing solution is an aqueous solution of a metal salt of a metal compound that includes a Group 9 and Group 10 metal component selected from the group consisting of cobalt and nickel, and wherein the amount of said Group 9 and Group 10 metal component incorporated into said support material is such as to provide in said composition an amount of said Group 9 and Group 10 metal component in the range of from 0.5 wt. % to 20 wt. %;

drying said metal-incorporated support material so that it contains a volatiles content in the range of from 2 to 20 wt. % LOI;

incorporating hydrocarbon oil and a polar additive having a dipole moment of at least 0.45 into said metal-incorporated support material to thereby provide an oil and additive impregnated composition having a weight ratio of said hydrocarbon oil to said polar additive in the range upwardly to 10:1; and, contacting said oil and additive impregnated composition under suitable hydrogen treatment conditions with hydrogen to thereby provide a hydrogen-treated composition.

10. A method as recited in claim 9, wherein said metal compound further includes a Group 6 metal component selected from the group consisting of molybdenum and tungsten, and wherein the amount of said Group 6 metal component incorporated into said support material is such as to provide in said composition an amount of said Group 6 metal component in the range of from 5 wt. % to 50 wt. %.

11. A method as recited in claim 9, wherein said hydrocarbon oil comprises hydrocarbons having a boiling temperature in the range of from 100° C. to 550° C. and can be selected from hydrocarbon mixtures of the group consisting of heavy naphtha, kerosene, diesel, gas oil, olefins having carbon numbers in the range of from 12 to 40 carbons, and mixtures of alpha olefins having carbon numbers in the range of from 18 to 30.

* * * * *